3,047,533
VINYLCHLORIDE POLYMER BLENDS WITH GRAFT COPOLYMERS OF A CONJUGATED DIENE/ALKYL ACRYLATE COPOLYMER, AN UNSATURATED HYDROCARBON, AND AN UNSATURATED NITRILE
William C. Calvert, Gary, Ind.
No Drawing. Filed Aug. 3, 1959, Ser. No. 831,023
16 Claims. (Cl. 260—45.5)

This invention relates to polyvinylchloride blends exhibiting new and unexpected properties. In one specific aspect thereof, this invention relates to high impact polyvinylchloride blends.

Polyvinylchloride resins are generally resistant to abrasion and are chemically inert, exhibiting excellent resistance to most salts, acids, alkalies, alcohols, aliphatic hydrocarbons, etc., and good resistance to degradation by oxygen, ozone and ultra violet light. Also, these materials exhibit good flame resistance, being self-extinguishing if ignited. Because of these outstanding properties, recently increasing amounts of polyvinylchloride resins in unplasticized or but slightly plasticized form have been used in the production of various structural shapes such as rigid sheets and moldings, pipes, valves, fittings, and similar objects.

However, unplasticized or but slightly plasticized polyvinylchloride resins have low impact values and this seriously limits the production and utilization of rigid shaped articles made from such materials. Thus, in the production of rigid shaped articles from such materials, sharp directional transitions must be avoided and threading of such articles is not recommended. In the utilization of such rigid shaped articles care must be exercised to avoid force fitting and overstressed conditions during assembly (for example, of pipe and required fittings and valves) and the final assembly must not be subjected to vibration, shock, or impact loads during use.

Attempts have been made to overcome the deficient impact strength of polyvinylchloride resins by blending certain materials therewith. While blends exhibiting higher impact values than the straight polyvinylchloride resin component may be produced by such blending procedures, the improvement in this physical characteristic is accompanied by a sacrifice in one or more of the desirable characteristics of the polyvinylchloride resin component. As a result, the production and permissible uses of rigid shaped articles made from such blends is still seriously circumscribed.

I have found that blends of polyvinyl chloride with a graft copolymer of the nature described specifically and in detail subsequently not only exhibit a high impact value but also possess the desirable physical characteristics of the polyvinylchloride component.

The polyvinylchloride component of the blends of this invention may be a vinyl chloride homopolymer or a copolymer produced by the polymerization of a mixture of a major proportion (80%–85% or more) vinyl chloride and a minor proportion (15%–20% or less) of one or more other monomers copolymerizable with vinyl chloride. A wide variety of monomers and monomer mixtures may be copolymerized with vinyl chloride to produce such copolymers but vinyl acetate, vinyl stearate, vinylidene chloride, acrylic acid esters or mixtures of two or more of these materials are most commonly used for the purpose.

One object of this invention is to provide polyvinylchloride blends characterized by a high impact value.

A corollary object of this invention is to provide a graft copolymer having utility as a component of polyvinylchloride blends.

Additional objects of this invention will become apparent as the description thereof proceeds.

Graft copolymers suitable for use as one component in the production of the high impact polyvinylchloride blends of this invention are prepared by the interaction, under polymerizing conditions, of a mixture of a vinyl aromatic hydrocarbon or an asym. alkyl, aryl substituted ethylene and vinyl cyanide or vinyl cyanide type compounds, exemplified by a mixture of styrene and acrylonitrile, with a conjugated diolefin/alkyl acrylate copolymer latex, exemplified by a butadiene/ethyl acrylate copolymer latex.

The organic reactants portion of the reaction mixture employed to prepare the graft copolymer blending components of this invention comprises from about 20% to about 60% by weight (dry basis) of the conjugated diolefin/alkyl acrylate copolymer and, correspondingly, 80% to 40% by weight combined vinyl aromatic hydrocarbon or asym. alkyl, aryl substituted ethylene plus vinyl cyanide or vinyl cyanide type compound. The vinyl aromatic hydrocarbon or the asym. alkyl, aryl substituted ethylene may comprise from about 30% to about 70% by weight of the organic reactants portion of the reaction mixture, the vinyl cyanide or vinyl cyanide type compound may comprise from about 10% to about 30% by weight of this mixture and, as previously mentioned, the conjugated diolefin/alkyl acrylate copolymer comprises from about 20% to about 60% by weight (dry basis) of the organic reactants portion of the reaction mixture.

Confining attention for the nonce to the conjugated diolefin/alkyl acrylate copolymer latex, this may comprise, on the dry basis, from about 30% by weight to about 90% by weight of conjugated diolefine and, correspondingly, 70% by weight to 10% by weight of alkyl acrylate.

Further exemplifying graft copolymers suitable for use as one component in the production of the high impact polyvinylchloride blends of this invention, the following data set forth highly advantageous ranges and eminently suitable specific organic reactants that may be employed in the preparation of such graft copolymers.

The organic reactants portion of the reaction mixture employed to prepare the graft copolymers may comprise from about 20% to about 40% by weight (dry basis) of a butadiene/ethyl acrylate copolymer and, correspondingly, 80% to 60% by weight styrene plus acrylonitrile. The styrene may comprise from about 40% to about 50% by weight of the organic reactant portion of the reaction mixture, the acrylonitrile from about 20% to about 30% by weight of this mixture and, as previously mentioned, the butadiene/ethyl acrylate copolymer may comprise from about 20% to about 40% by weight (dry basis) of the organic reactants portion of the reaction mixture.

Confining attention for the moment to the butadiene/ethyl acrylate copolymer latex, this may comprise, on the dry basis, from about 50% by weight to about 75% by weight butadiene and, correspondingly, 50% by weight to 25% by weight ethyl acrylate.

For the better understanding of this invention Examples 1–3 to follow set forth a description of the preparation of representative graft copolymers suitable for use as a component in forming the high impact polyvinylchloride blends of this invention. It will be noted that Examples 1–3 are identical with respect to the nature of the several organic reactants used although there are some differences in the proportions in which certain of these organic reactants are employed in the individual examples. The nature and amounts of auxiliary materials employed in the polymerization recipes are the same in all examples.

*Examples 1–3*

Three aqueous copolymer latices were individually prepared using the following recipes which are expressed in parts by weight. Since the auxiliary materials employed were identical in all recipes, both with respect to the nature and the amount thereof, data covering these are presented but once in the following tabulation.

| Example | 1 | 2 | 3 |
|---|---|---|---|
| Butadiene | 50 | 75 | 90 |
| Ethyl acrylate | 50 | 25 | 10 |
| Total | 100 | 100 | 100 |
| Potassium persulfate | | 0.45 | |
| Mixed tertiary alkyl mercaptans (Note A) | | 0.3 | |
| Sodium salt of hydrogenated disproportionated rosin | | 4.0 | |
| Sodium salts of condensed alkyl naphthalene sulfonic acid | | 0.2 | |
| Sodium oleate | | 1.0 | |
| Sodium sulfate derivative of 7-ethyl 2-methyl 4-undecanol | | 2.65 | |
| Distilled water | | 200.0 | |

Note A.—A mixture of $C_{12}$, $C_{14}$ and $C_{16}$ tertiary alkyl mercaptans in approximately 60:20:20 ratio.

For each example, the appropriate recipe was charged into an individual pressure tight reactor. The reactors were placed in a water bath heated to 95° C. and were rotated therein for a period of about four hours after which time conversion to the aqueous copolymer latex employed as a backbone in the subsequent graft copolymerization step was essentially complete.

The three aqueous copolymer latices so prepared were individually subjected to a graft copolymerization reaction to form graft copolymer blending components of the present invention. Since the operating techniques were the same in all of these graft copolymerization operations and the additional organic reactants and the auxiliary materials employed were identical (both with respect to nature and amount) in all three recipes, the following single recipe (set forth in parts by weight) and description serves to cover each of the three individual operations actually performed.

| | |
|---|---|
| Butadiene/ethyl acrylate copolymer latex (dry basis) (from Example 1 or 2 or 3) | 30.0 |
| Sodium salt of hydrogenated disproportionated rosin | 2.8 |
| Sodium pyrophosphate | 0.3 |
| Sodium hydroxide | 0.15 |
| Dextrose | 1.0 |
| Distilled water (Note B) | 200.0 |

Note B.—Includes water present in the aqueous butadiene/ethyl acrylate copolymer latex.

A reactor containing a graft copolymerization recipe was placed in a water bath heated to 65° C. and rotated therein until the contents of the reactor were brought to water bath temperature. At this time a solution containing 0.1 part by weight of the sodium salt of ethylenediamine tetra-acetic acid and 0.0125 part by weight ferrous sulfate heptahydrate dissolved in 2.5 parts by weight distilled water was added to the reactor. Following this addition, there was injected into the reactor over a period of one hour a mixture (expressed in parts by weight) consisting of:

| | |
|---|---|
| Styrene | 45 |
| Acrylonitrile | 25 |
| Cumene hydroperoxide | 1 |

During addition of the above mixture of monomers and catalyst the reaction temperature was maintained at 65° C. and after addition of the mixture was complete the reactor contents were maintained at this temperature level for another hour. At the end of this time the graft copolymerization reaction was complete as evidenced by the fact that steam distillation of a portion of the final latex did not carry any monomer overhead.

At the conclusion of the graft copolymerization reaction the reactor was opened and 1.25 parts by weight 2,2′-methylene bis-(4-methyl 6-t-butyl phenol) were added to the reaction mixture which was then cooled. This compound is an antioxidant employed to improve the processing and environmental stability of the graft copolymer. This particular antioxidant may be replaced, in part or entirely, by one or a combination of the many known antioxidants conventionally employed for such purposes or, if desired, use of an antioxidant may be dispensed with entirely with some sacrifice, of course, of the processing and environmental stability of the graft copolymer.

The cooled aqueous latex was coagulated by pouring into 600 parts by weight water containing one part by weight sodium chloride, one part by weight alum and two parts by weight sulfuric acid. The resulting coagulated mixture was heated to 95° C. to bring about partial granulation of the coagulum thereby facilitating subsequent filtering and washing operations, filtered, washed, and the washed precipitate dried to constant weight at 65° C.

For reasons already set forth in detail the above graft copolymerization procedure has been described as though one graft copolymer was involved. Actually, three somewhat similar but nevertheless individual graft copolymers were prepared. Neglecting minor auxiliary components all three of these graft copolymers had the following gross composition:

| | |
|---|---|
| Butadiene/ethyl acrylate copolymer | 30 |
| Styrene | 45 |
| Acrylonitrile | 25 |
| | 100 |

The three graft copolymers differed in the butadiene/ethyl acrylate ratio of the copolymer backbone component. On this basis, the gross compositions of the three individual graft copolymers were as follows:

| Graft copolymer of Example No. | 1 | 2 | 3 |
|---|---|---|---|
| Butadiene | 15 | 22.5 | 27 |
| Ethyl acrylate | 15 | 7.5 | 3 |
| Styrene | 45 | 45 | 45 |
| Acrylonitrile | 25 | 25 | 25 |
| Total | 100 | 100 | 100 |

The above analyses are obviously expressed in accordance with a practice frequently employed in the chemical art wherein the composition of a product is set forth on the basis of the proportions of starting materials interacting to form the product in question, it being well understood that the product itself does not actually contain, as such, any of the materials set forth in the analysis. Very frequently (e.g., in the present instance) such a method of expressing compositions is much more enlightening than analyses giving the true ultimate composition of the product (here, the percentages of carbon, hydrogen, nitrogen and oxygen) and accordingly this method is employed in the present specification and claims.

Portions of the three graft copolymers were individually worked on a two roll mill with a roll temperature of 320° F. All exhibited good milling properties and produced transparent milled sheets. The milled sheets were molded to produce test specimens for the determination of certain physical properties which are set forth below:

| Graft copolymer of Example No. | 1 | 2 | 3 |
|---|---|---|---|
| Notched Izod Impact Value, ⅛ in. bar Ft.Lbs./Inch of Notch, 22.8° C. (A.S.T.M Method D-256) | 11.4 | 2.8 | 1.3 |
| Heat Distortion Temperature, ° C. (A.S.T.M. Method D-648) | ---- | 91.0 | ---- |
| Rockwell Hardness, R Scale (A.S.T.M. Method D-785) | 73 | 81 | 91 |

It will be noted that the impact value of the graft copolymers of this invention decreases while the surface hardness thereof increases as the proportion of butadiene in these graft copolymers increases.

Example 4

The graft copolymers of Examples 1-3 were individually blended with polyvinylchloride at various graft copolymer:polyvinylchloride ratios and physical properties of the resulting blends were determined. A conventional, general purpose polyvinylchloride was employed in making the blends shown in the table below.

In making the blends of this example the selected graft copolymer and the polyvinylchloride in the desired ratio, plus 2% by weight of dibutyl tin mercaptide based on the amount of polyvinylchloride present, were worked on a two roll mill with a roll temperature of 320° F. After fluxing occurred, milling was continued for a few additional minutes to produce a uniform blend which was then sheeted from the mill. In all instances the milling operation proceeded readily and smoothly with rapid and complete blending of the components of the mill recipe to form a transparent sheet.

The compositions (expressed in parts by weight) and certain physical properties of the blends produced are shown in the following table.

| Graft Copolymer of— | Pts. by Wt. | Polyvinyl-chloride, Pts. by Wt. | Dibutyl tin Mer-captide, Note C, Pts. by Wt. | Impact, Note D | Hardness, Note E |
|---|---|---|---|---|---|
| Example 1 | 30 | 70 | 1.4 | 22.1 | 104 |
| Do | 20 | 80 | 1.6 | 19.3 | 107 |
| Do | 15 | 85 | 1.7 | 5.1 | 111 |
| Do | 10 | 90 | 1.8 | 2.7 | 113 |
| Example 2 | 30 | 70 | 1.4 | 16.0 | 106 |
| Do | 20 | 80 | 1.6 | 14.8 | 111 |
| Do | 15 | 85 | 1.7 | 10.5 | 112 |
| Do | 12.5 | 87.5 | 1.75 | 2.3 | 113 |
| Do | 10 | 90 | 1.8 | 2.2 | 109 |
| Example 3 | 30 | 70 | 1.4 | 3.2 | 109 |
| Do | 20 | 80 | 1.6 | 1.5 | 113 |

Note C.—Employed to improve the processing and environmental stability of the polyvinylchloride component of the blends. Dibutyl tin mercaptide may be replaced, in part or entirely, by one or a combination of the many other known stabilizers conventionally employed in polyvinylchloride systems or, if desired, use of stabilizers may be omitted entirely with some sacrifice, of course, in the processing and environmental stability of the polyvinylchloride component.
Note D.—Notched Izod impact value, ⅛ inch bar, expressed in foot pounds per inch of notch. Determined at 22.8° C. (A.S.T.M. Method D-256).
Note E.—Rockwell hardness, R scale. (A.S.T.M. Method D-785).

As may be seen from the data of the above table, the impact value of the graft copolymer-polyvinylchloride blends increases as the proportion of graft copolymer in the blends increases. However, this behavior is subject to certain limitations for, as has been previously shown, the impact values of the straight 100% graft copolymers used as a component of the blends of the above table are lower than the impact values of blends of said graft copolymers with polyvinylchloride in, say, a 20:80 ratio. Accordingly, it is obvious that on extending blend compositions beyond the range covered in the above table a point will be reached where further increases in the proportion of graft copolymer in the blend will result in a decrease in impact value. Blends covering a much wider composition range than those of the above table demonstrate that the impact value of the blends increases very rapidly as the graft copolymer content is increased up to around 20% by weight of the blend. With further increases in the graft copolymer content of the blends, the impact value increases rather slowly to a maximum value at a graft copolymer content in the neighborhood of 30%-50% by weight following which the impact value begins to decrease with further increases in graft copolymer content. From the standpoint of cost, blends containing more than say 30% graft copolymer are of little if any interest. The graft copolymer is the more expensive component of the blends and little if any practical benefit follows the use of more than around 30% by weight graft copolymer in the blends. Accordingly, blends containing more than this amount of the graft copolymer blending component are not considered herein.

The butadiene/ethyl acrylate ratio of the copolymer backbone employed in producing the graft copolymer blending components of this invention has a pronounced influence on the ability of these graft copolymers to enhance the impact value of polyvinylchloride when blended therewith. The impact enhancing ability of such graft copolymers generally increases as the butadiene/ethyl acrylate ratio of the copolymer backbone decreases. Thus, when this ratio is 1:1 or 3:1 the impact values of polyvinylchloride blends containing 30% by weight of the graft copolymer are very high (22.1 and 16.0 foot pounds per inch of notch respectively) but when the butadiene/ethyl acrylate ratio is increased to 9:1, polyvinylchloride blends containing 30% by weight of such a graft copolymer blending component exhibit an impact value of only 3.2 foot pounds per inch of notch, a value which barely exceeds the minimum specification for Type II high impact polyvinylchloride set forth in Commercial Standard CS201-55 of the U.S. Department of Commerce.

Here too economic considerations determine, in large measure, the most advantageous graft copolymer blending component. Butadiene is much less expensive than ethyl acrylate and accordingly the cost of the graft copolymer blending components of this invention decreases as the butadiene/ethyl acrylate ratio of the copolymer backbone increases. On the other hand, and as discussed in the previous paragraph, the impact enhancing ability of these graft copolymers is in direct relationship to the raw material cost thereof. Accordingly, a polyvinylchloride blend of a desired impact value may be produced either by blending a small amount of a comparatively expensive graft copolymer with a large amount of polyvinylchloride or by blending a rather large amount of an inexpensive graft copolymer with a relatively small amount of polycinylchloride. An economic analysis of the situation is further complicated by the fact that polyvinylchloride is less expensive than the graft copolymer blending components of the present invention. Accordingly, an accurate determination of the most advantageous graft copolymer blending component to employ in the production of a polyvinylchloride blend of a desired impact value requires a careful analysis of a number of opposing economic factors discussed in detail previously herein on the basis of the relative magnitude of these factors at the particular time the blend is to be produced.

Example 5-7

As previously shown, the use of a copolymer backbone having a butadiene/ethyl acrylate ratio of 1:1 gives rise to a graft copolymer blending component that is highly effective in enhancing the impact value of polyvinylchloride when blended therewith. To demonstrate the general applicability of alkyl esters of acrylic acid as a reactant in forming the graft copolymer blending component of the blends of this invention, the present examples show three such graft copolymers made using a copolymer backbone having the above mentioned highly effective (but somewhat costly) butadiene/alkyl acrylate ratio of 1:1.

The following tabulation presents the respective monomers and the proportions thereof (expressed in parts by weight) employed in producing the copolymer backbones of these examples:

| Example No. | 5 | 6 | 7 |
|---|---|---|---|
| Butadiene | 50 | 50 | 50 |
| Isopropyl acrylate | 50 | | |
| Butyl acrylate | | 50 | |
| 2-ethyl hexyl acrylate | | | 50 |

The auxiliary materials employed (both with respect to identity and amount) and the operating procedure followed in preparing the three aqueous backbone copolymer latices of the above compositions were as previously described in Examples 1-3. After preparation the three aqueous backbone copolymer latices of Examples 5-7 were separately subjected to a graft copolymerization reaction to form three graft copolymer blending components. The organic reactants were employed in the following proportions in the graft copolymerization reactions:

Butadiene/alkyl acrylate copolymer latex (dry basis)
(from Example 5 or 6 or 7) _____ 45
Styrene _____ 45
Acrylonitrile _____ 25

The operating procedure followed and the auxiliary materials employed (both with respect to identity and amount) in the preparation of the graft copolymer blending components of the present examples were as previously described in Examples 1-3. Examples 1-3 also provide a description of the methods followed here for isolating the graft copolymer blending components. On milling the graft copolymers of Examples 5-7 each produced light colored, transparent, rigid sheets.

*Example 8*

The graft copolymers of Examples 5-7 were individually blended with polyvinylchloride at various graft copolymer:polyvinylchloride ratios, using the procedure and the auxiliary material and the particular variety of polyvinylchloride described in Example 4 hereof.

The compositions (expressed in parts by weight) and certain physical properties of the blends are shown in the following table:

| Graft Copolymer of— | Pts. by Wt. | Polyvinyl-chloride, Pts. by Wt. | Dibutyl tin Mercaptide, Note C, Pts. by Wt. | Impact, Note D | Hardness Note E |
|---|---|---|---|---|---|
| Example 5 | 30 | 70 | 1.4 | 8.4 | 107 |
| Do | 20 | 80 | 1.6 | 3.4 | 110 |
| Example 6 | 30 | 70 | 1.4 | 7.1 | 104 |
| Do | 20 | 80 | 1.6 | 4.6 | 110 |
| Example 7 | 30 | 70 | 1.4 | 4.0 | 104 |
| Do | 20 | 80 | 1.6 | 11.9 | 109 |

Notes C, D and E.—See correspondingly designated notes of Example 4.

It has been found that blends of polyvinylchlorides from a wide variety of sources with the blending components of this invention exhibit properties essentially similar to those previously given. The polyvinylchlorides employed as a component in forming the blends of this invention may contain pigments, fillers, plasticizers, stabilizers, and the like conventionally employed in the compounding of polyvinylchloride.

Since the graft copolymer blending components of this invention are obtained in the form of aqueous latices, if the polyvinylchloride is also available in the form of a latex then extremely uniform blends of this invention may be prepared by mixing appropriate volumes of the polyvinylchloride latex and of the graft copolymer latex and then coagulating the resulting mixture and separating, washing and drying the resulting coagulum by conventional methods.

If desired, blends prepared in accordance with this invention may contain additional components, such as pigments, fillers, and the like, frequently incorporated into resins and resin blends in accordance with conventional practices of the art.

The general fields of utility of the blends of this invention are self evident. However, as will be obvious from the physical characteristics of these blends, they find their greatest field of usefulness in the fabrication of shaped articles subject to vibration, shock, impact loads, and the like during use. Due to the high resistance of these blends to deterioration under the influence of various atmospheric agencies, rigid shaped articles made therefrom are ideally suited for use under conditions where a high environmental stability is required. Structural shapes made from the blends of this invention characterized by a high impact strength are eminently suited for use in the production of rigid sheets and moldings, pipe, fittings, valves, valve parts, and similar objects.

As has been indicated previously, a number of variations are possible with respect to the reactants and the proportions thereof employed in the preparation of the graft copolymer blending components of this invention.

Thus, the butadiene component of the mixture employed to form the aqueous copolymer backbone latex may be replaced, in part or entirely, by other conjugated diolefines. In the preparation of such other latices the butadiene component may be replaced, in part or entirely, by such conjugated diolefines as isoprene, pentadiene-1,3, the methyl 1,3-pentadienes, dimethyl butadiene-1,3, the 1,3- and 2,4-hexadienes, and the like, including mixtures of two or more such conjugated diolefins (including butadiene-1,3).

As previously demonstrated herein, a wide variety of alkyl acrylates may be employed as the other component of the mixture employed to form the aqueous copolymer backbone latex. All available alkyl acrylates, ranging from methyl acrylate to octyl acrylates, have been investigated and all have been found to be operable in the preparation of the graft copolymer blending components of this invention.

Likewise, in the preparation of graft copolymer blending components of this invention, the styrene may be replaced, in part or entirely, by such other vinyl aromatic hydrocarbons as the vinyl toluenes and vinyl xylenes and asym. alkyl, aryl substituted ethylene such as alpha methyl styrene, alpha methyl vinyl toluenes, alpha methyl vinyl xylenes, and the like, including mixtures of two or more such hydrocarbons (including styrene).

Also, if desired, in the preparation of graft copolymer blending components of the compositions of this invention the acrylonitrile may be replaced, in part or entirely, with other vinyl cyanide type compounds such as methacrylonitrile, ethacrylonitrile, and the like, including mixtures of two or more such compounds (including acrylonitrile).

Be it remembered, that while this invention has been described in connection with specific details and examples thereof, these details and examples are illustrative only and are not to be considered limitations on the spirit and scope of said invention except insofar as these may be incorporated in the appended claims.

I claim:

1. An impact resistant blend comprising (A) a material selected from the group consisting of vinyl chloride homopolymers and copolymers of at least 80% by weight vinyl chloride and up to 20% by weight of a monovinyl compound copolymerizable therewith and (B) a graft copolymer, said graft copolymer formed by polymerizing a mixture of material selected from a group consisting of vinyl benzene, vinyl toluene, vinyl xylene, alpha methyl vinyl benzene, alpha methyl vinyl toluene, alpha methyl vinyl xylene, and mixtures thereof with a material selected from a group consisting of acrylonitrile, methacrylonitrile, ethacrylonitrile, and mixtures thereof in the presence of a copolymer consisting of a conjugated diolefin and an alkyl acrylate, the alkyl substituent of said alkyl acrylate containing from one to about eight carbon atoms.

2. An impact resistant blend comprising (A) from about 70% to about 90% by weight, based on the total weight of (A) and (B), of a material selected from the group consisting of vinyl chloride homopolymers and copolymers of at least 80% by weight vinyl chloride and up to 20% by weight of a monovinyl compound copolymerizable therewith and, correspondingly, (B) from 30% to 10% by weight, based on the total weight of (A) and (B), of a graft copolymer, said graft copolymer formed by polymerizing a mixture of material selected from a group consisting of vinyl benzene, vinyl toluene, vinyl xylene, alpha methyl vinyl benzene, alpha methyl vinyl toluene, alpha methyl vinyl xylene, and mixtures thereof with a material selected from a group consisting of acrylonitrile, methacrylonitrile, ethacrylonitrile, and mixtures thereof in the presence of a copolymer consisting of a conjugated diolefin and an alkyl acrylate, the alkyl substituent of said alkyl acrylate containing from one to about eight carbon atoms.

3. An impact resistant blend comprising (A) a material selected from the group consisting of vinyl chloride homopolymers and copolymers of at least 80% by weight vinyl chloride and up to 20% by weight of a monovinyl compound copolymerizable therewith and (B) a graft copolymer, said graft copolymer formed by polymerizing a mixture of styrene together with acrylonitrile in the presence of a copolymer consisting of a butadiene and an alkyl acrylate, the alkyl substituent of said alkyl acrylate containing from one to about eight carbon atoms.

4. An impact resistant blend comprising (A) from about 70% to about 90% by weight, based on the total weight of (A) and (B), of a material selected from the group consisting of vinyl chloride homopolymers and copolymers of at least 80% by weight vinyl chloride and up to 20% by weight of a monovinyl compound copolymerizable therewith and, correspondingly, (B) from 30% to 10% by weight, based on the total weight of (A) and (B), of a graft copolymer said graft copolymer formed by polymerizing a mixture of styrene together with acrylonitrile in the presence of a copolymer consisting of a butadiene and an alkyl acrylate, the alkyl substituent of said alkyl acrylate containing from one to about eight carbon atoms.

5. An impact resistant blend comprising (A) from about 70% to about 90% by weight, based on the total weight of (A) and (B), of a material selected from the group consisting of vinyl chloride homopolymers and copolymers of at least 80% by weight vinyl chloride and up to 20% by weight of a monovinyl compound copolymerizable therewith and, correspondingly, (B) from 30% to 10% by weight, based on the total weight of (A) and (B), of a graft copolymer, said graft copolymer formed by polymerizing a mixture of from 10% to 30% by weight acrylonitrile together with from 30% to 70% by weight styrene in the presence of 20% to 60% by weight of a copolymer consisting of a butadiene and an alkyl acrylate, the alkyl substituent of said alkyl acrylate containing from one to eight carbon atoms, said copolymer of a butadiene and an alkyl acrylate containing from about 30% to 90% by weight butadiene and from about 70% to 10% by weight alkyl acrylate.

6. The product of claim 5, further characterized by the fact that the alkyl acrylate is methyl acrylate.

7. The product of claim 5, further characterized by the fact that the alkyl acrylate is ethyl acrylate.

8. The product of claim 5, further characterized by the fact that the alkyl acrylate is a propyl acrylate.

9. The product of claim 5, further characterized by the fact that the alkyl acrylate is a butyl acrylate.

10. The product of claim 5, further characterized by the fact that the alkyl acrylate is an octyl acrylate.

11. An impact resistant blend comprising (A) from about 70% to about 90% by weight, based on the total weight of (A) and (B), of a material selected from the group consisting of vinyl chloride homopolymers and copolymers of at least 80% by weight vinyl chloride and up to 20% by weight of a monovinyl compound copolymerizable therewith and, correspondingly, (B) from 30% to 10% by weight, based on the total weight of (A) and (B), of a graft copolymer, said graft copolymer formed by polymerizing a mixture of 20% to 30% by weight of acrylonitrile together with from 40% to 50% by weight styrene in the presence of 20% to 40% by weight of a copolymer consisting of butadiene and an alkyl acrylate, the alkyl substituent of said alkyl acrylate containing from one to about eight carbon atoms, said copolymer consisting of butadiene and alkyl acrylate comprising from about 50% to 70% by weight butadiene and about 50% to 25% by weight of alkyl acrylate.

12. The product of claim 11, further characterized by the fact that the alkyl acrylate is methyl acrylate.

13. The product of claim 11, further characterized by the fact that the alkyl acrylate is ethyl acrylate.

14. The product of claim 11, further characterized by the fact that the alkyl acrylate is a propyl acrylate.

15. The product of claim 11, further characterized by the fact that the alkyl acrylate is a butyl acrylate.

16. The product of claim 11, further characterized by the fact that the alkyl acrylate is an octyl acrylate.

References Cited in the file of this patent
UNITED STATES PATENTS
2,802,809    Hayes _____ Aug. 13, 1957

FOREIGN PATENTS
767,642    Great Britain _____ Feb. 6, 1957

UNITED STATES PATENT OFFICE
CERTIFICATE OF CORRECTION

Patent No. 3,047,533                                                                July 31, 1962

William C. Calvert

It is hereby certified that error appears in the above numbered patent requiring correction and that the said Letters Patent should read as corrected below.

In the grant, lines 1 to 3, for "William C. Calvért, of Gary, Indiana," read -- William C. Calvert, of Gary, Indiana, assignor to Borg-Warner Corporation, of Chicago, Illinois, a corporation of Illinois, --; line 12, for "William C. Calvert, his heirs" read -- Borg-Warner Corporation, its successors --; in the heading to the printed specification, line 7, for "William C. Calvert, Gary, Ind." read -- William C. Calvert, Gary, Ind., assignor to Borg-Warner Corporation, Chicago, Ill., a corporation of Illinois --; column 7, line 10, for "45" read -- 30 --.

Signed and sealed this 25th day of December 1962.

(SEAL)
Attest:

ERNEST W. SWIDER                                        DAVID L. LADD
Attesting Officer                                            Commissioner of Patents